United States Patent Office 2,759,653
Patented Aug. 21, 1956

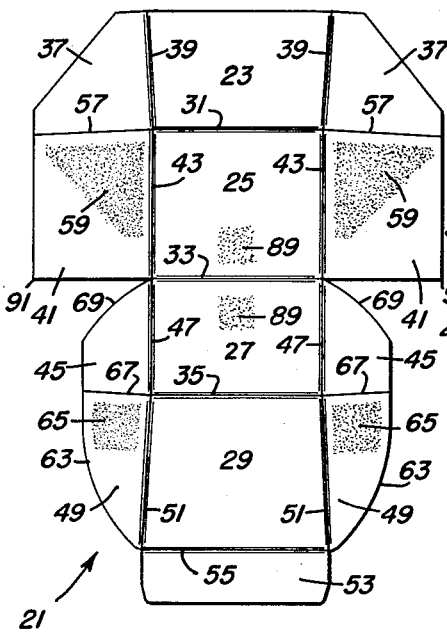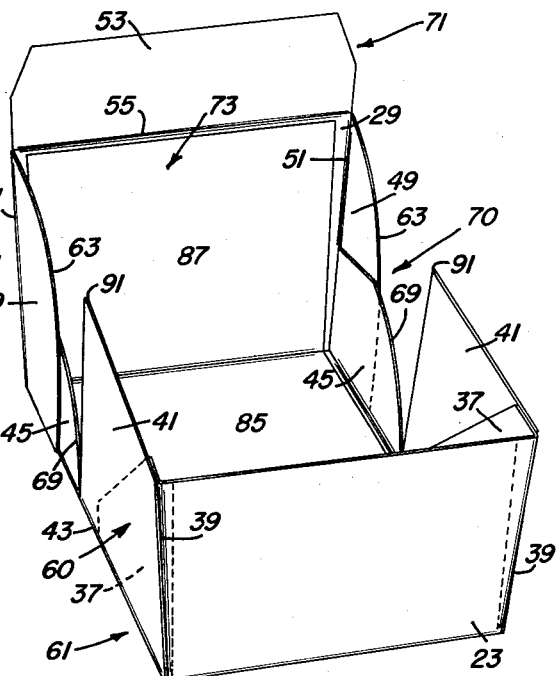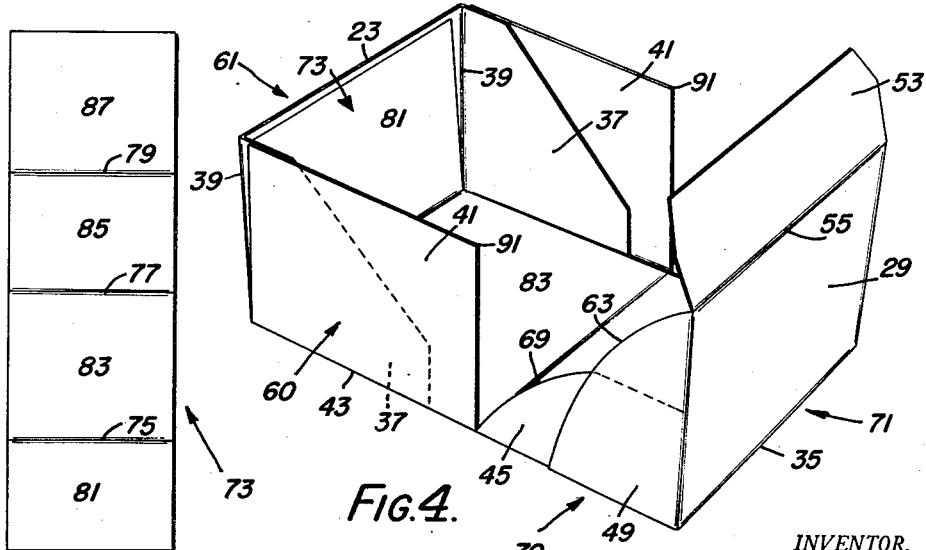

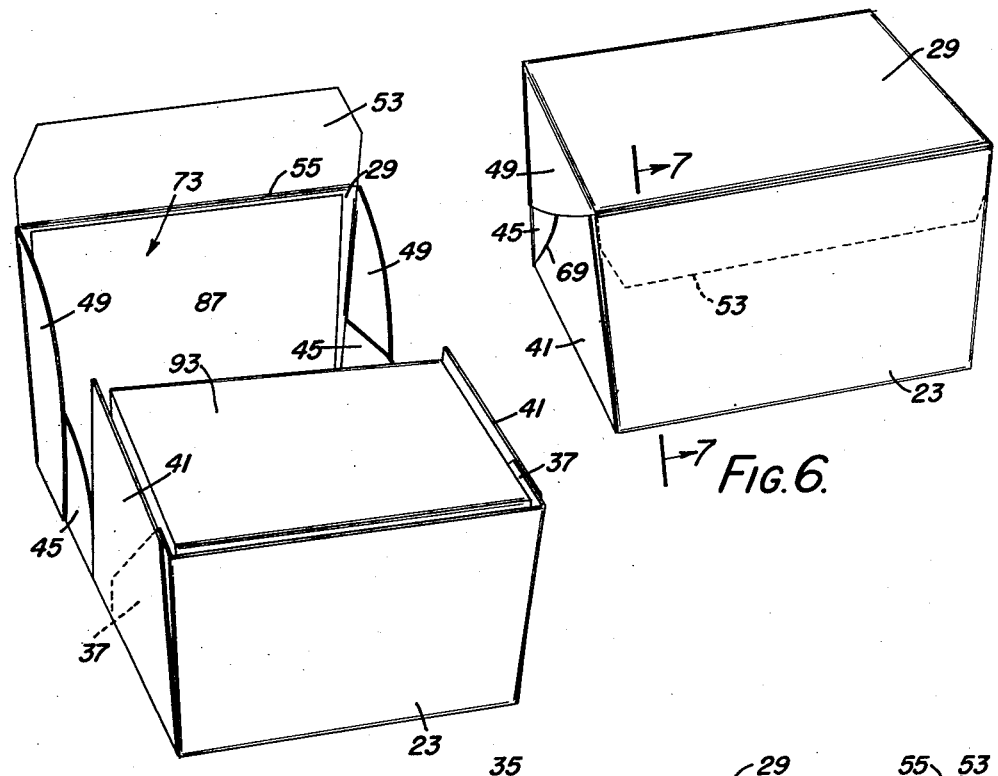
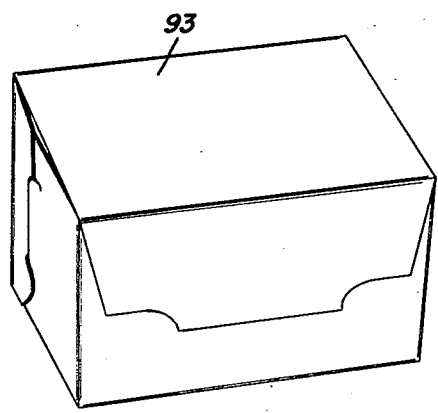
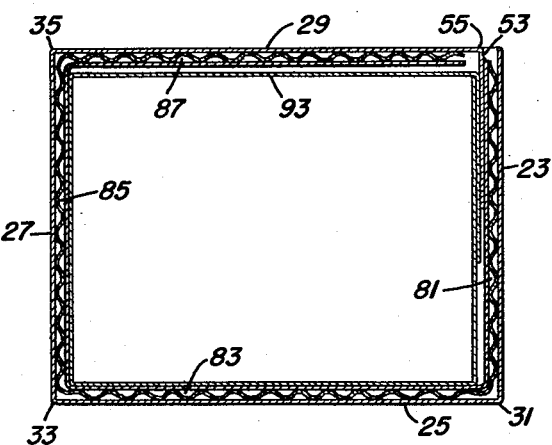

2,759,653
INSULATED CARTON

Harrison C. Bloomer and William H. Inman, Newark, N. Y., assignors to Bloomer Bros. Company, Newark, N. Y., a corporation of New York Application May 24, 1952, Serial No. 289,864

4 Claims. (Cl. 229—36)

This invention relates to carrying cartons, and more particularly to cartons for enclosing a package of ice cream or other frozen comestible for preventing excessive heat transfer to said comestible during transportation under nonrefrigerated conditions, one object of the invention being to provide an improved carton requiring a minimum of material, which may be readily and economically manufactured and set up in partially-erected position.

In the past, the purchaser of ice cream or other frozen comestible, has had to take special precautions to prevent the ice cream from melting during the trip home from the grocery store or delicatessen. This problem was more acute during the warm months of the year and, in order to prevent excessive melting or thawing, the purchaser was obliged to keep to a minimum the time when the comestible was under nonrefrigerated conditions between the purchase thereof and the placement of the same in his refrigerator or frozen-food locker. However, it was not always possible to get the ice cream back under refrigeration before it had melted excessively and leaked out of the package onto other foods, the seat or floor of the automobile, or the purchaser's clothing, if he should be carrying the package. In order to overcome this problem, many stores provided a supply of special insulating bags within which the package of frozen ice cream or the like could be inserted to prevent rapid thawing of the same and allow the purchaser a longer period in which he could safely transport the ice cream under nonrefrigerated conditions. However, these insulated bags are expensive and quite bulky and cumbersome so that there use has not been convenient and has not met with wide-spread favor.

Another object of our invention, therefore, is to provide an insulated carrying carton which is not only inexpensive, but which, because it is similar in shape and only slightly larger than the package of food to be enclosed therein, is compact and takes up little more space than that required by the uninsulated package containing the frozen food.

Another object is to provide a carrying carton having the above advantages which may be shipped in said partially-erected condition to the user who may, after placing the container of frozen food within the carrying carton, readily complete the erection of the carton by merely swinging the carton to closed, fully-erected position.

A further object is to provide a carrying carton of the above character that may be readily made from a one-piece blank and which, when in its partially-erected position, may be compactly stacked or nested with a series of similar cartons, thereby requiring a minimum of shipping and storage space.

Still a further object is to provide a carrying carton having the above construction which is provided with insulating material for further insulating the contents of the carton and preventing excessive heat transfer to the same.

To these and other ends the invention resides in certain improvements and combination of parts, all as will be hereinafter more fully described, the novel features being pointed out in the claims at the end of the specification.

In the drawings:

Fig. 1 is a plan view of a one-piece blank cut and scored ready for folding to form a carton embodying the present invention;

Fig. 2 is a plan view of a strip of insulating material which forms the lining of the carton;

Fig. 3 is a perspective view of the carton in partially-erected position, as viewed generally from the front;

Fig. 4 is similar to Fig. 3, but shows the partially-erected carton as viewed generally from the back;

Fig. 5 is a perspective view similar to Fig. 3, but shows a package of frozen comestible in place within said carton;

Fig. 6 is a perspective view showing the carton closed and in the fully-erected position thereof;

Fig. 7 is a sectional view substantially along the line 7—7 in Fig. 6, and

Fig. 8 is a perspective view of a package of frozen comestible removed from the outer carrying carton for purposes of illustration.

The preferred embodiment of the invention, herein disclosed by way of illustration, is embodied in the present instance in a container made from a one-piece cardboard blank, such as shown generally at 21 in Fig. 1, cut from a sheet of stock. Blank 21 may be suitably waxed to make it moistureproof and is preferably scored, as indicated by multiple lining in the drawings to form front, bottom, back and cover wall portions 23, 25, 27 and 29, respectively, foldably connected along score lines 31, 33, and 35, as shown in Fig. 1. Bottom and back walls 25 and 27, respectively, are substantially rectangular as shown in Fig. 1, whereas front wall and cover 23 and 29, respectively, are substantially trapezoidal in shape for allowing compact nesting of the partially-erected cartons as hereafter more fully pointed out.

Front wall 23 has a pair of end closure flaps 37 hingedly connected thereto along a pair of outwardly flaring fold lines 39 (Fig. 1). Bottom 25 has a pair of substantially rectangular end closure flaps 41 foldably connected thereto along a pair of spaced, substantially parallel fold lines 43 (Fig. 1). Back wall 27 has a pair of end closure flaps 45 hingedly connected thereto at opposite sides thereof along a pair of spaced, substantially parallel fold lines 47 (Fig. 1). Cover 29 has a pair of end closure flaps 49 hingedly connected thereto along a pair of spaced outwardly flaring fold lines 51 (Fig. 1). A closure flap or tab 53 is foldably connected to cover 29 along a fold line 55.

End closure flaps 37 are substantially triangular and each has the inner free edge 57 thereof cut at substantially right angles to the respective outwardly flaring fold line 39 for a purpose to be hereafter described. Closure flaps 41 are each preferably provided with glue or other adhesive as at 59 for securing flaps 41 to the outer surface of adjacent ones of flaps 37 for forming a pair of substantially rectangular end closure portions shown generally at 60 (Fig. 4), for holding front front wall 23 in erected position relative to bottom 25 and for forming with said front and bottom walls a body section shown generally at 61 (Figs. 3 and 4).

End closure flaps 49 are substantially triangular and each is formed with the outer free edge 63 curved or arcuate, as shown in Fig. 1. Flaps 49 are adapted to be detachably secured to the adjacent ones of flaps 45 by glue or other suitable adhesive 65 (Fig. 1) which may be applied to flaps 49 as shown in Fig. 1. The inner free edge 67 (Fig. 1) of flaps 49 is formed at substantially right angles to the respective diverging fold lines 51, as shown in Fig. 1, for a purpose to be hereafter more fully described. Closure flaps 45 are each formed with the inner free edge portion 69 curved as shown in Fig. 1, and with the adjacent one of flaps 49 form a pair of substantially triangular end closure portions shown generally at 70 (Fig. 4). The securing together of adjacent ones of flaps 45 and 49 forms closure portions 70, holds cover 29 in erected position relative to back wall 27 thereby forming a second body section shown generally at 71 (Figs. 3 and 4), and completes the partial erection of the carton.

All that is necessary to complete the erection of the carton is to swing body section 71 about fold line 33 into superposed position with body section 61 as shown in Fig. 6, and upon insertion of the locking flap or tongue 53 inside front wall 23, the carton will be releasably held in fully-erected, closed position.

In order to improve the insulating properties of our carrying carton, we prefer to line a portion of the carton with an insulating material, shown generally at 73 (Fig. 2), such as corrugated or pressed paper material, or creped wadding such as that available under the trade name "Kimpak," or other suitable and known insulating material. The insulating material is preferably scored for folding at 75, 77 and 79 as indicated by multiple lining in Fig. 2 to form foldably connected, front, bottom, back and cover portions 81, 85 and 87, respectively, which extend over or line the respective carton wall portions as shown in Figs. 3 and 4. Insulation 73 is held in position in the carton by loosely adhering bottom and back portions 83 and 85, respectively, to the carton bottom and back wall 25 and 27, respectively, by glue or other suitable adhesive 89 which is preferably applied to said carton bottom and back wall as shown in Fig. 1.

As pointed out above, and as shown in Fig. 1, front and cover portions 23 and 29, respectively, are substantially trapezoidal and flare outwardly towards the free edges thereof, thereby flaring the respective body sections outwardly towards the open ends thereof to allow compact nesting of the partially-erected cartons for shipment and storage. This nesting feature is further aided by the fact that the inner edge portions 57 of closure flaps 37 extend at substantially right angles to fold lines 39 rather than fold lines 43. Thus, when flaps 37 are folded inwardly into engagement with bottom 25 adjacent fold lines 43, as in Fig. 4, front wall 23 is swung to nearly vertical position, but the upper free edge thereof is held inclined outwardly, thereby forming a body section 61 with an outward flare towards the front of the carton. In a similar manner, the forming of inner edge portion 67 of flaps 49 at substantially right angles to fold lines 51, rather than fold lines 47, prevents cover 29 from being moved to a completely perpendicular position relative to back 27, for when edges 67 are brought into position parallel with back 27 as in Fig. 4, cover 29 will extend somewhat outwardly towards the open end of the body section. Thus, due to the inclination of the inner edges 57 and 67 of flaps 37 and 49, respectively, the front and cover portions flare outwardly away from one another towards the open ends of the respective body sections when the carton is in partially-erected position as shown in Figs. 3 and 4. This, plus the trapezoidal shape of front and cover portions 23 and 29, respectively, allow the partially-erected cartons to be compactly nested for shipping and storage.

It is to be noted that in setting up the carton in its partially-erected position, flaps 49 are glued to the outside of flaps 45, and flaps 41 are glued to the outer surface of flaps 37. Flaps 49 and 45 are so shaped that when glued together the free edges 63 and 69, respectively, thereof form a substantially straight line (Fig. 4) and, as the carton is being fully erected, said flaps both engage the corresponding flap 41 at approximately the same time, thereby guiding flaps 41 and 37 inside of flaps 49 and 45, and aiding in the easy erection and closure of the carton by the user. As flaps 41 extend inside flaps 45 and 49, the outer surface of the erected carton is smooth and has no loose flaps or edges which might catch and tear. In addition, the upper free corner portions 91 (Figs. 1 and 4) of flaps 41 engage the inside of the cover as the carton is closed and aid in frictionally holding the carton in its fully-erected, closed position.

In use the cartons are preferably set up in partially-erected position as shown in Figs. 3 and 4 at the place of manufacture, the insulating lining 73 secured in place therein and the cartons then shipped in nested form to the ice cream dealer who provides a supply of these cartons adjacent the deep freeze compartments, so that when a customer purchases a package 93 (Fig. 8) of ice cream or other frozen comestible, his package is placed within the partially-erected carton, as shown in Fig. 5. It is then a simple matter to press slightly inwardly on flaps 41, swing body section 71 relative to body section 61 and insert tongue 53 inside front wall 29 to releasably hold said carton in fully-erected, closed position completely enclosing the inner package. Because of the insulating properties of our carrying carton, it is now possible for the customer to leave the package of frozen comestible within the outer container for extended periods of time without such heat transfer to the frozen package as to initiate appreciable thawing of the same.

This allows the customer to safely carry the ice cream or other frozen comestible under nonrefrigerated conditions for long periods of time without running the risk of the ice cream melting and leaking out of the carton with the objectionable consequences described above. It is contemplated that before the package of frozen food is placed in the refrigerator or deep freezer, the purchaser will remove the outer insulating carton which may then be used again for insulating other packages while under nonrefrigerated conditions. Not only is our insulated carton useful to the purchaser of ice cream and frozen foods in carrying the same home, but also it may be used on picnics and camping trips to extend the period within which the ice cream or food may safely remain under nonrefrigerated conditions.

Thus it will be seen that our invention provides an inexpensive insulated carrying carton, which may be readily and economically formed from a one-piece blank of cardboard, and readily set up in partially-erected position. Our cartons are adapted to compactly nest or stack together so as to require a minimum of shipping or storage space, and, in addition, they may be easily set up from partially-erected to fully-erected position by hand in one simple, closing operation.

It will thus be seen that the invention accomplishes its objects and, while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:

1. A carton adapted to be shipped in a partially erected open position, comprising a one piece blank, cut, scored, and folded to form foldably connected front, bottom, back and cover walls, said front and cover walls being trapezoidal in shape and arranged so that the long edges of said trapezoids will coincide when the carton is fully erected and closed, end closure flaps foldably connected to said front and bottom walls at opposite ends thereof, adjacent ones of said end closure flaps being secured together for holding said front wall in erected position and forming with said front and bottom walls a first body section, end closure flaps foldably connected to said back and cover walls at opposite ends thereof, adjacent ones of said back and cover wall end closure flaps being secured together for holding said cover wall in erected position relative to said back wall and forming with said cover and back wall a second body section, said trapezoidal front and cover walls flaring said first and second body sections, respectively, outwardly towards the ends thereof to facilitate the nesting of said cartons in the partially erected open position thereof, said second body section being foldable about said first body section for completely erecting said carton, and a detachable connection for releasibly holding said carton in closed and fully erected position.

2. A carton as specified in claim 1 in which said end closure flaps are cut and connected for holding the cover wall and said front wall in an erected position at an angle of slightly less than 90 degrees with the plane formed by the bottom wall of said carton, thereby flaring said first and second body sections outwardly towards the open ends thereof in a direction at right angles to the flare caused by said trapezoidal front and cover sections, to facilitate nesting of said cartons in the partially erected open position thereof.

3. A carton as specified in claim 1, containing a strip of insulating material lining the interior of said front, back, bottom and cover walls of said carton for protecting the contents of said carton against excessive heat transfer.

4. A carton as specified in claim 1 in which said cover wall end closure flaps are substantially triangular in shape with outer free edges of arcuate shape and for forming with the respective back wall end closure flaps a pair of substantially triangular end closure portions adapted to be engaged outside said end closure flaps of said front and bottom walls in the fully erected position of the carton.

References Cited in the file of this patent

UNITED STATES PATENTS

| | | |
|---|---|---|
| 769,915 | Nostrand | Sept. 13, 1904 |
| 959,261 | Reber | May 24, 1910 |
| 1,707,853 | Haberman | Apr. 2, 1929 |
| 1,730,816 | Grigg | Oct. 8, 1929 |
| 1,759,455 | Hinkley | May 20, 1930 |
| 2,337,654 | Goodyear | Dec. 28, 1943 |
| 2,475,323 | James | July 5, 1949 |
| 2,493,338 | Buttery | Jan. 3, 1950 |